Aug. 23, 1932.     J. W. MOORE     1,873,621
PIPE JOINT
Filed Oct. 17, 1929
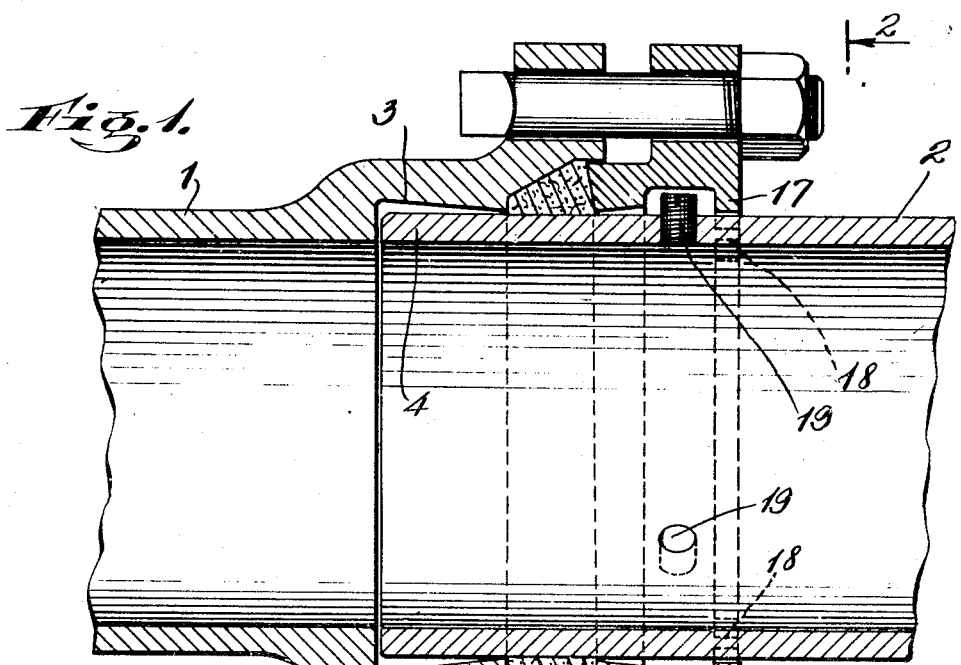
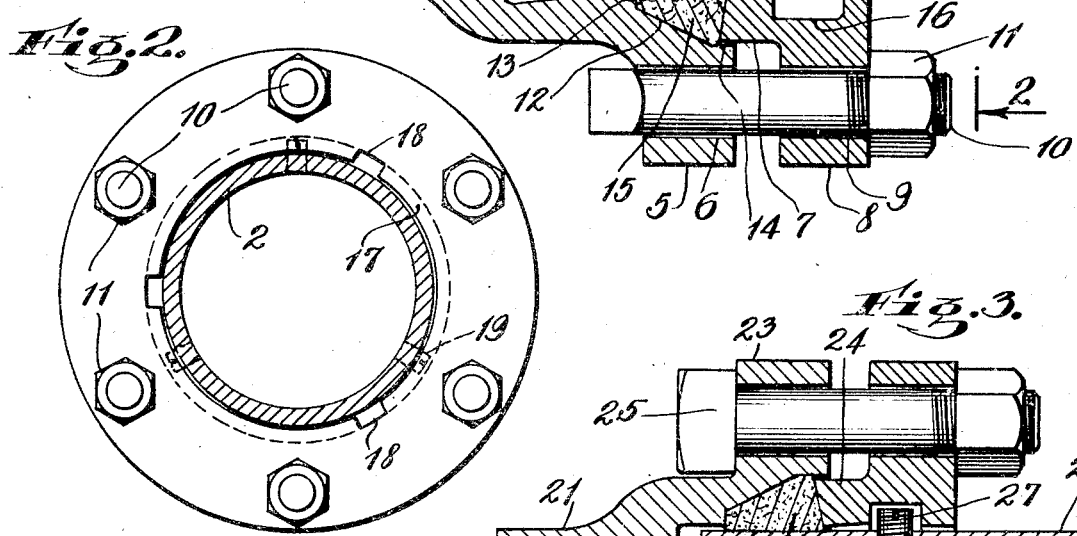
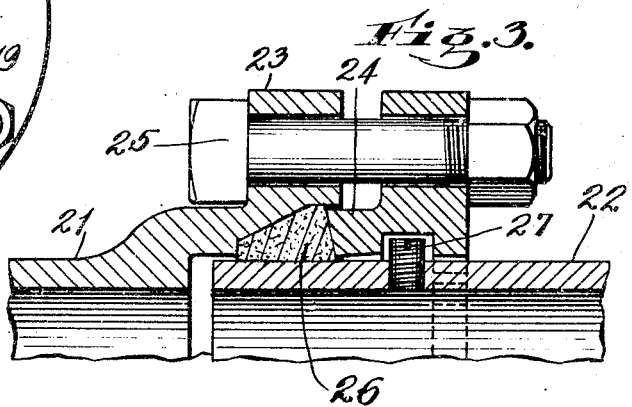
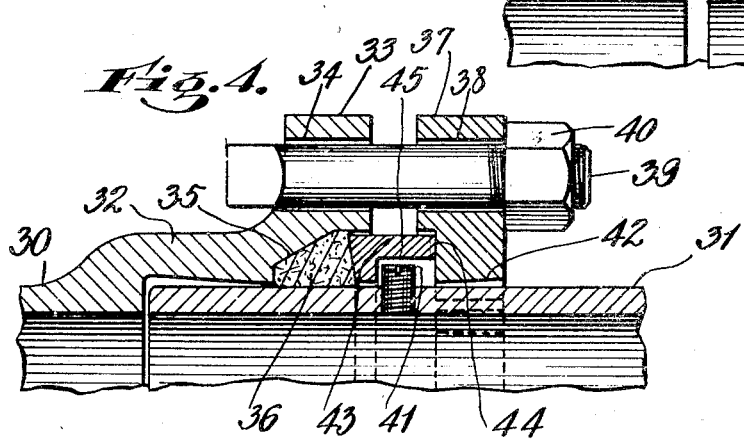
INVENTOR.
JAMES W. MOORE
BY Meyers & Jones
ATTORNEYS.

Patented Aug. 23, 1932

1,873,621

UNITED STATES PATENT OFFICE

JAMES W. MOORE, OF BIRMINGHAM, ALABAMA, ASSIGNOR TO AMERICAN CAST IRON PIPE COMPANY, OF BIRMINGHAM, ALABAMA, A CORPORATION OF GEORGIA

PIPE JOINT

Application filed October 17, 1929. Serial No. 400,271.

This invention is an improvement in pipe joints of the bell and spigot type, and more particularly in a positive locking arrangement for stuffing box gland type of box joints, such as to permit substantial relative longitudinal movement of the bell and spigot members, positively limit outward movement of the spigot member, and also positively prevent complete withdrawal thereof from the bell member.

In the usual construction of pipe joints of the character in question, the friction grip of the gasket against the socket and spigot end surfaces of the pipes is relied upon to prevent endwise separation. While this arrangement is to a large extent satisfactory, there is still no positive lock against endwise separation of the pipes, that is, a lock of a nature to positively prevent such separation, and at the same time permit limited relative movement due to expansion and contraction without affecting the tightness of the packed joint.

One of the primary objects of the present invention is the provision of a lock for pipe joints of this character, wherein there is a positive locking engagement between the pipes thus effectually to prevent endwise separation thereof, and at the same time allowing for limited expansion and contraction between the connected pipes.

Another object is the provision of a simple, relatively inexpensive locking means, enabling the quick and easy assembling or disassembling of the pipe sections.

With these and other objects in view the invention consists in the construction and novel combination of parts fully described hereinafter, illustrated in the accompanying drawing, and pointed out in the claims appended hereto, it being understood that various changes in the form, proportion, size and minor details of construction within the scope of the claims, may be resorted to without departing from the spirit of the invention.

In the drawing forming a part hereof:

Fig. 1 is a longitudinal section of a pipe joint constructed in accordance with the invention.

Fig. 2 is a section on the line 2—2 of Fig. 1.

Figs. 3 and 4 are detail views in section of alternate constructions.

In the embodiment of the invention shown in Figs. 1 and 2, the pipe sections to be connected are indicated at 1 and 2, the section 1 having a socket 3, in which fits the spigot end 4 of the section 2. At the end of the socket, the pipe section 1 is provided with a marginal lateral flange 5 for a purpose to be described, and this flange is provided with openings 6 at intervals, the axes of the opening being parallel with the axis of the pipe section.

An annular gland in the form of a ring cooperates with the section 2 and the flange 5, to positively lock the sections. The said gland is in the form of a collar 7, having a flange 8, which is provided with openings 9, registering with the openings 6 of the flange 5.

Bolts 10 are passed through the registering openings, and are engaged by nuts 11, to hold the collar to the flange. The openings 6 and 9 in the present instance, are six in number, the number, however, depending upon circumstances, and the bell or socket end of the pipe section 1 is cast or reamed to provide a flaring portion 12 with a shoulder 13 at its inner end in a plane transverse to the axis of the pipe 1, and a shoulder 14 at right angles to the shoulder 13.

A packing ring or gasket 15 is arranged between the shoulders 13 and 14, the said packing being substantially wedge-shaped as shown, and of any suitable material. The end of the collar 7 fits within the part 14 of the ream of the bell and bears against the packing 15. The arrangement is such that when the collar is drawn toward the pipe section 1 by tightening the nuts 11, the packing 15 is compressed, and expanded radially of the pipe, thus tightening the joint, and effectually preventing leakage.

The collar 7 is releasably locked to the pipe section 2, by mechanism to be described. Referring to Fig. 1, it will be noticed that the collar is internally reamed intermediate its ends, as indicated at 16. This provides an internal flange 17 at the end of the collar remote from the pipe section 1. This flange has notches 18 at intervals, in the present instance, at intervals of 120°, and the notches are adapted to permit the passage of radial projections 19 on the pipe section 2. In the present instance, the radial projections are screws threaded into radial openings in the pipe section, and they are adapted to pass through the notches 18, to enter the ream or channel 16. When the pipe section 2 is turned to bring the lugs out of register with the notches 18, it will be apparent that the lugs will engage the flange 17, to lock the pipe section 2 to the collar.

In assembling the improved joint, the packing or gasket is inserted, the collar is connected to the pipe section 2, by passing the projections 19 through the notches 18, and moving the collar and pipe section angularly with respect to each other, to bring the projections out of register with the notches. The collar may be connected to the pipe section 1 at this time, or it may be connected to the said pipe section before the pipe 2 is engaged therewith. After the parts are assembled, as above described, the nuts 11 are tightened to complete the joint.

It will be apparent that as the nuts 11 are tightened, the flange 17 will eventually engage the projections 19, and the spigot end of the pipe 2 will be pulled with the gasket into the bell or socket of the section 1, and the gasket will be tightly compressed. With this arrangement there is a positive lock between the two pipe sections, which functions to prevent separation thereof. It will be apparent that the projections 19 may be lugs cast on the pipe or welded, or elements to be detachably connected with the pipe, as in the present instance.

Fig. 1 shows the doublex simplex type of joint, with a deep socket, while Fig. 3 shows the same mechanism applied to a Simplex type of joint. In this arrangement, the pipe sections 21 and 22 have the bell 23 and the collar 24 respectively, connected by bolts and nuts 25. The packing or gasket 26 is similar to the gasket 15, and is engaged by the collar in the same manner. The pipe section 22 has the projections 27, and the construction of the collar 24 is precisely the same as the collar 28, and is engaged with the pipe section 22 in the same manner as the collar 7 is engaged with the section 2. The bell or socket is shallower than that of Fig. 1, the construction being otherwise the same.

In Fig. 4, the pipe sections 30 and 31 have bell and spigot ends respectively, the bell being indicated at 32, and the bell is provided with the flange 33 having the openings 34. The bell is cast or internally reamed, as shown at 35, in the same manner as the bell 3 of Fig. 1, and for a similar purpose, that is, to receive a packing or gasket 36. The collar 7—8 of Fig. 1, is replaced by a ring 37, having openings 38 registering with the openings 34, the registering openings being adapted to receive bolts 39, which are engaged by nuts 40.

The pipe section 31 has the lugs or projections 41, corresponding to the lugs 19 of Fig. 1, and the ring 37 has internal axial grooves 42, through which the lugs may pass, the lugs and grooves being similarly spaced, and spaced in the same manner as the Fig. 2 construction.

A collar 43 is arranged between the packing 36 and the ring 37, one end of the collar bearing against the packing, and the other against the ring 37, which is counterbored, as shown at 44, to receive the end of the collar. The ring is counterbored, as shown at 45, to enable angular movement of the lugs 41. The improved joint is assembled in the same manner as the joint shown in Fig. 1.

It will be noted, referring to the drawing, that the packing or gasket in each construction is compressed, axially of the pipe, between an annular shoulder in the bell and the end of the collar. The portion 12 of the ream in the bell end, of Fig. 1, and corresponding portions in the other figures, tends to force the packing radially toward the pipe, and the inner end of the collar, and the inner end of the ring 43 are beveled inwardly, so that when the bell is tightened, the tendency is to expand the gasket radially of the pipe, while compressing it longitudinally or axially of the pipe.

It will be noted that in all cases and especially as shown in Figs 1 and 4, the length in the axial direction of the channel such as 16 (Fig. 1) of gland collar 8, is such as to permit substantial axial movement of the screws or equivalent lugs 19; that is to permit essential lengthwise movement of the spigot pipe member within and in relation to the bell, these movements being necessitated by temperature changes or other forces acting on the pipe members; and without such provision the pipe lines would be caused to buckle or break. It is also evident in the drawing that flange 17, Fig. 1, and collar 37 in Fig. 4, will positively engage the lugs or screws 19 and limit the outward movement of the pipe 2 and prevent complete withdrawal from the bell; also that during the movements of the spigot member the tightness of the packed joint is maintained.

The described construction or arrangement is of special advantage in constructing pipe lines of cast iron pipe in which in many cases a section has to be cut off at the site of pipe-line construction, in order to accommodate the length of the pipe section to a space to be filled. The section 2 may represent a pipe section which has been cut off at the spigot end, leaving a plain cylindrical spigot end 4 without any flare, flange or bead which would engage with a stop ring to prevent separation of the pipe members, as in my companion application, Ser. No. 400,271 of even filing date. The pipe member 2 may, however, be easily drilled and tapped by the use of ordinarily available tools, to receive the screw studs 19, which are inserted and the joint then completed in the manner described.

What is claimed as new is:

1. A joint for pipes of the bell and spigot type comprising a compressible packing between the spigot and the bell, spaced clamping rings on the bell and spigot, a packing compression member between said clamping rings abutting the packing but not abutting the ring on the bell, radially extending stops on the spigot for engagement with a surface of the ring on the spigot and a surface of the compression member, means connecting the rings to force the compression member against the packing to seal the joint between the bell and spigot, said surfaces on the ring and compression member being spaced apart a distance greater than the width of the stops to permit axial movements of the pipes after the packing is compressed to seal the joint.

2. A joint for sections of pipe wherein one section has a spigot end and the other a bell end to receive the spigot end with a packing therebetween, spaced radial projections on the spigot section, a gland around the spigot section to compress the packing, said gland having an annular channel with spaced openings leading thereto through the side of the gland for insertion of the radial projections into the channel, means for securing the gland tightly against the packing, and the width of the channel being greater than the width of the radial projections to permit predetermined axial movement of the pipe sections relative to each other.

3. A joint for sections of pipe wherein one section has a spigot end and the other has a bell end to receive the spigot end with a packing therebetween, spaced radially projecting lugs on the spigot section beyond the ends of the bell section, packing compression means comprising a collar around the spigot and having a flange engaging the packing and a channel to receive the lugs, the collar having openings enabling passage of the lugs into the channel, and the relative widths of the lugs and channel being such as to permit relative axial movement between the sections of pipe with maintenance of the packing seal.

4. A joint for sections of pipe wherein one section has a spigot end and the other has a bell end to receive the spigot end with a packing therebetween, spaced radially projecting screw studs inserted in tapped holes in the spigot section beyond the end of the bell section, packing compression means comprising a collar around the spigot and having a flange engaging the packing and channel to receive the studs, the collar having openings enabling passage of the studs into the channel, and the relative widths of the studs and channel being such as to permit relative axial movement between the sections of pipe with maintenance of the packing seal.

Signed at Birmingham, Ala., in the county of Jefferson and State of Alabama this 5th day of October, A. D. 1929.

JAMES W. MOORE.